(12) United States Patent
Galasso

(10) Patent No.: US 6,598,165 B1
(45) Date of Patent: Jul. 22, 2003

(54) SECURE MEMORY

(75) Inventor: Leonard J. Galasso, Rancho Santa Margarita, CA (US)

(73) Assignee: Phoenix Technologies Ltd., San Jose, CA (US)

(*) Notice: Subject to any disclaimer, the term of this patent is extended or adjusted under 35 U.S.C. 154(b) by 0 days.

(21) Appl. No.: 09/335,704

(22) Filed: Jun. 18, 1999

(51) Int. Cl.[7] .................................................. G06F 1/24
(52) U.S. Cl. ........................ 713/189; 713/156; 713/161; 713/180
(58) Field of Search ................................ 713/156, 161, 713/175, 180, 155, 189

(56) References Cited

U.S. PATENT DOCUMENTS

| 5,533,123 A | * | 7/1996 | Force et al. ............... 380/2 |
| 5,651,068 A | | 7/1997 | Klemba |
| 5,764,762 A | | 6/1998 | Kazmierczak |
| 6,094,724 A | * | 7/2000 | Benhammou et al. ........ 705/41 |
| 6,249,872 B1 | * | 6/2001 | Wildgrube et al. ......... 713/200 |

\* cited by examiner

*Primary Examiner*—Thomas R. Peeso

(57) ABSTRACT

A flash memory is secured by disabling write access to the device, thereby preventing unauthorized updating or tampering of the contents. A cryptoengine is included in an integrated circuit (IC) with the flash memory. An attempt to write to the flash memory is successful only if a received encrypted certificate is authenticated by the cryptoengine. If not authenticated, the write enable signal line and the power applied to the flash memory are disabled.

17 Claims, 3 Drawing Sheets

SECURE MEMORY

BACKGROUND OF THE INVENTION

1. Field of the Invention

The invention relates generally to secure flash memory storage, and more specifically, to a system and method for using cryptographic authentication to ensure secure read and write access to a flash memory array.

2. Description of the Related Art

The advent of the Internet and the ever-increasing internetworking of computers has enabled users to access vast amounts of information remotely. At the same time, it has made valuable data stored in the memory of the computers accessible to attack and corruption by a remote user. For example, a hacker with moderate sophistication can effectively reprogram a flash memory, which can store a computer's BIOS or preboot functionality. To address these attacks, many encryption systems and algorithms have been developed to ensure that only authorized users can alter the data stored in memory.

Typical encryption algorithms, such as RSA or DSA public key/private key encryptions, require the remote user to present a digital certificate that must be authenticated before the remote user is authorized to read or write from the memory of a local computer. A program running on either the remote computer, the local computer or both generally performs this authentication. To perform the authentication, the program either sends information back and forth between the remote and local computers or does all the processing at one of the computers.

When the authentication information is being transmitted between the computers, the authentication information is subject to being scoped by a "hacker". Even when the authentication only occurs in the local computer, the program running on the local computer generates external activity that is also subject to being scoped. As a result, a hacker can effectively reprogram the memory, and in the process nullify security controls and any software-based security policy that might have been in force previously. Accordingly, the encryption and authentication should be performed in a manner that would limit or eliminate the ability for a hacker to scope the authentication information and therefore secure the data in memory from being corrupted or attacked remotely.

SUMMARY OF THE INVENTION

In a secure memory storage for a microprocessor's firmware, updates to a memory array can use a cryptographic authentication. Using this cryptographic authentication, software attempting to gain access to the memory array, such as to overlay the contents of the memory, e.g., a "flash update", would not be afforded access to the programming, or write enable signals of the memory array without the proper cryptographic credentials.

Briefly, consistent with the present invention, an integrated circuit, comprises a memory for receiving data information including at least an encrypted digital certificate, an enable signal that enables an operation to be performed on the memory and a power signal that powers the memory, a cryptoengine, coupled to the memory, for receiving the encrypted digital certificate included in the data information, authenticating the received digital certificate, and producing a secure signal in response to a determination of authenticity, and first control logic, coupled to the cryptoengine and the memory, for selectively coupling at least one of the enable signal and the power signal to the memory in response to the secure signal, wherein the at least one of the enable signal and the power signal are not coupled to the memory if the secure signal is not produced by the cryptoengine.

In a further aspect of the present invention, a method for securing a memory, which includes a memory and a cryptoengine and is implemented on an integrated circuit, comprises the steps of receiving, at the memory, data information including at least an encrypted digital certificate, an enable signal that enables an operation to be performed on the memory and a power signal that powers the memory, authenticating the received digital certificate with the cryptoengine, producing a secure signal in response to a determination of authenticity, and selectively coupling at least one of the enable signal and the power signal to the memory in response to the secure signal, wherein the at least one of the enable signal and the power signal are not coupled to the memory if the secure signal is not produced.

DETAILED DESCRIPTION OF THE PREFERRED EMBODIMENT

The present invention will be described in the context of a specific embodiment, but the invention is not intended to be so limited.

In a secure flash consistent with the present invention, an embedded cryptographic engine can be used to authenticate a software-based, operating system-hosted cryptoengine. By coupling the authentication capability to the platform supporting the secure flash, the chain of trust is moved directly into the hands of the system integrator and/or original equipment manufacturer (OEM), who is more likely to be able to handle the updating of the flash components. The integration of the cryptoengine (and its microcode) and the flash memory array can be performed at the very high speed integrated circuit (VHSIC) hardware description language (VHDL) level and, when so integrated, can share the same integrated circuit (IC) housing.

Figure 1:
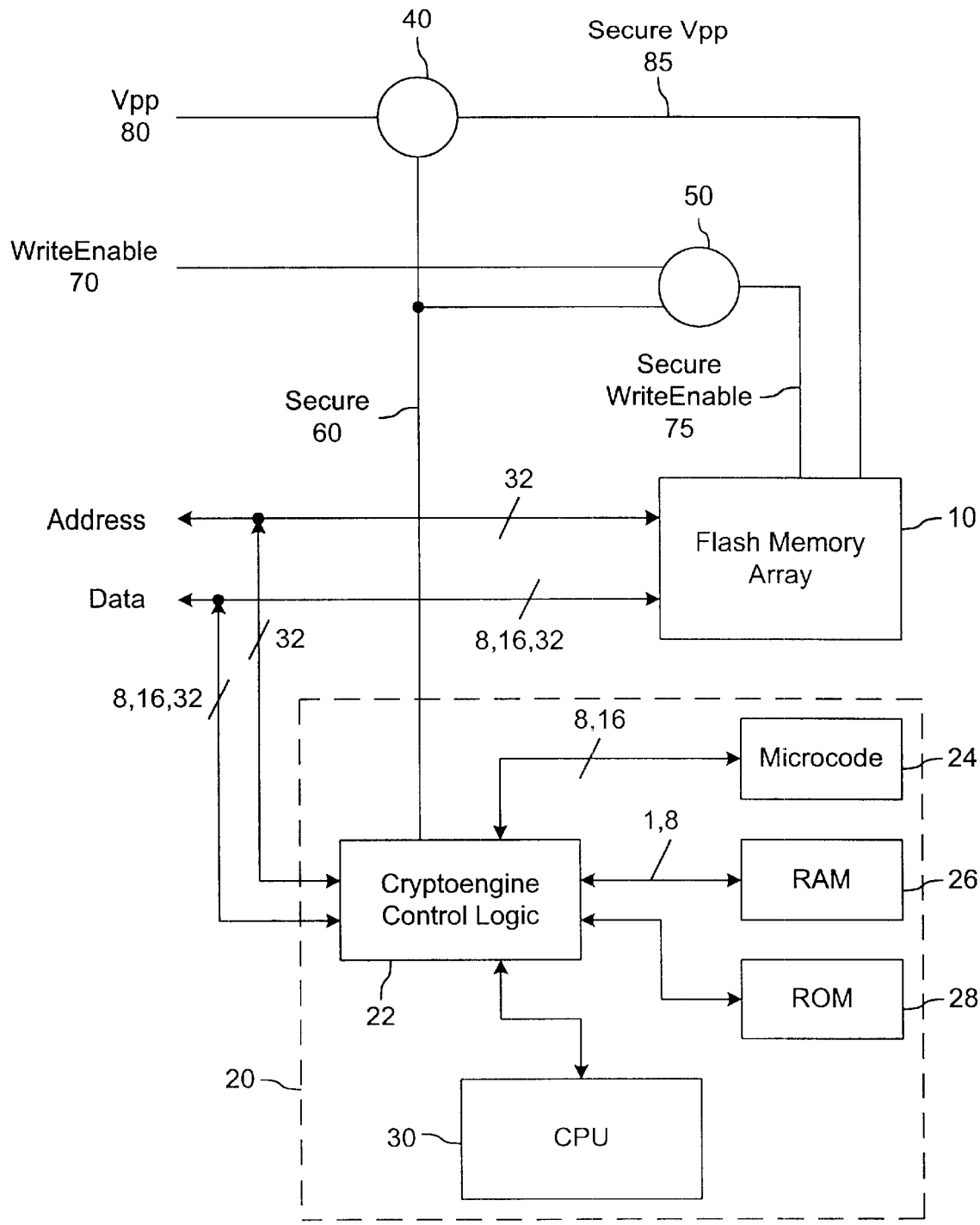
FIG. 1 is a block diagram of a secure flash memory system consistent with the present invention.

FIG. 1 is a block diagram of a secure flash 100 consistent with the present invention. As shown in FIG. 1, secure flash 100 includes a flash memory array 10, a cryptoengine 20, a first switch control 40 and a second switch control 50. Both flash memory 10 and cryptoengine 20 receive address and data lines. The number of address and data lines is variable and depends upon the particular system in which secure flash 100 is implemented. In FIG. 1, the address lines are represented as being 32 bits, and the data lines are represented as being 8, 16 or 32 bits.

A VHDL cryptoengine that may be used to implement the present invention is the patent entitled *Content Metering System,* by Greg Kazmierczak et al, U.S. Pat. No. 5,764,762. This Content Metering System uses another invention entitled, International *Cryptography Framework,* by Keith Klemba, et al, U.S. Pat. No. 5,651,068. Both of these patents are hereby incorporated by reference.

Cryptoengine 20 includes cryptoengine control logic 22, firmware 24, a RAM 26, a ROM 28 and a processor or CPU 30. The cryptoengine control logic 22 can be formed, for example, from a conglomeration of logic circuitry, such as logic gates, arithmetic logic units (ALUs) and other circuitry known to those skilled in the art. The cryptoengine control logic 22 can be embodied in VHDL and insertable into any application specific integrated circuit (ASIC) core. The cryptoengine control logic 22 can perform industry-standard cryptographic algorithms known to those skilled in the art, such as Triple DES, RSA and DSA. A secure signal is produced on a secure line 60 by cryptoengine control logic 22 when an attempt to write to the flash memory array 10 has been authenticated.

Firmware 24 stores a collection of micro-instructions that are executed by CPU 30 to instruct the cryptoengine control logic 22 to perform decryption and authentication, and can be implemented as a non-volatile storage, such as an NVRAM, ROM, PROM or EPROM. The micro-instructions in firmware 24 form a program embodying, for example, a key-based cryptosystem using a public key algorithm, such as DSA. ROM 28 is a private storage accessible to cryptoengine control logic 22, but inaccessible outside of cryptoengine 20. ROM 28 stores a unique digital certificate for the computer system in which the secure flash 100 is implemented. This digital certificate is preferably placed in ROM 28 at the time the secure flash 100 is manufactured. If the micro-instructions in firmware 24 embody a program for implementing a public key algorithm, such as DSA, then this digital certificate can represent the private key of the public key/private key pair.

Although firmware 24 and ROM 28 are shown as separate elements in FIG. 1, it should be understood that they can both be embodied in the same non-volatile storage. As a result, the microcode stored in firmware 24 can also be inaccessible outside of cryptoengine 20.

The flash memory array 10 is preferably a non-volatile memory storage, such as a PROM, EPROM or EEPROM. It can store data and information used by the computer system in which the secure flash 100 is implemented. For example, flash memory array 10 could store the BIOS or other pre-boot information used by the computer system to boot-up its operating system. The size of the flash memory array 100 can vary in size, but in general may be some multiple of two, such as 8 megabits.

As shown in FIG. 1, the flash-memory array is configured normally, with a power line VPP 70 data lines 15, address lines 25, a write enable line 80, as well as other lines (not shown) that can be brought out to connection pins. The write enable line 80 is routed through second switch control 50, and the VPP line 70 is routed through first switch control 40. Both switch controls are controlled by the cryptoengine control logic 22 in accordance with the secure signal line 60. The second switch control 50 can be implemented, for example, as an AND gate which receives the original write enable signal at one input and the secure signal from the output of the cryptoengine control logic 22 at the other input. The first switch control 40, through which the VPP signal is routed, can be implemented, for example, as a power MOSFET acting as a saturated switch capable of sourcing the current-drive requirements of the flash memory array 10 during programming. Unless the cryptoengine control logic 22 generates/asserts the secure signal, the signals on the write enable line 80 and VPP line 70 will not be gated to the flash memory array 10. As a result, the flash memory array 10 cannot be reprogrammed, i.e., written to, without the assertion of the secure signal.

The cryptoengine control logic 22 only generates the secure signal when the proper authentication has taken place, in response to the presentation of an appropriate digital certificate via the data bus and a control protocol. By properly presenting this digital certificate, the write enable line 80 and VPP line 70 are activated, thereby effectively presenting the user with a normal flash memory array. Without the presentation of such a certificate, i.e., the presentation of a corrupt certificate, the gating action of the write enable and VPP signals to the flash memory array 10 does not take place, thereby preventing a change to the contents of the flash memory array 10.

This prevention creates a locked flash array, whose contents can only be unlocked by the effectuation of proper credentials. Moreover, there is no requirement on the platform for any microprocessor or other computing entity to be executing except for the cryptoengine 20 itself. As a result, the controlling entity can be secure from the moment power is applied and before the controlling entity's system BIOS or firmware has had a chance to begin execution. By properly locking the contents of the flash memory array 10, updates can only be performed when the software has been given the proper credentials, which are presented to the secure flash 100 that does the actual authentication of the certificate.

Since the authentication takes place within the housing of the flash memory array 10 and the cryptoengine 20, there is no external activity which can be "scoped" by a hacker. Accordingly, the secure flash 100 is extremely secure.

Figure 2:
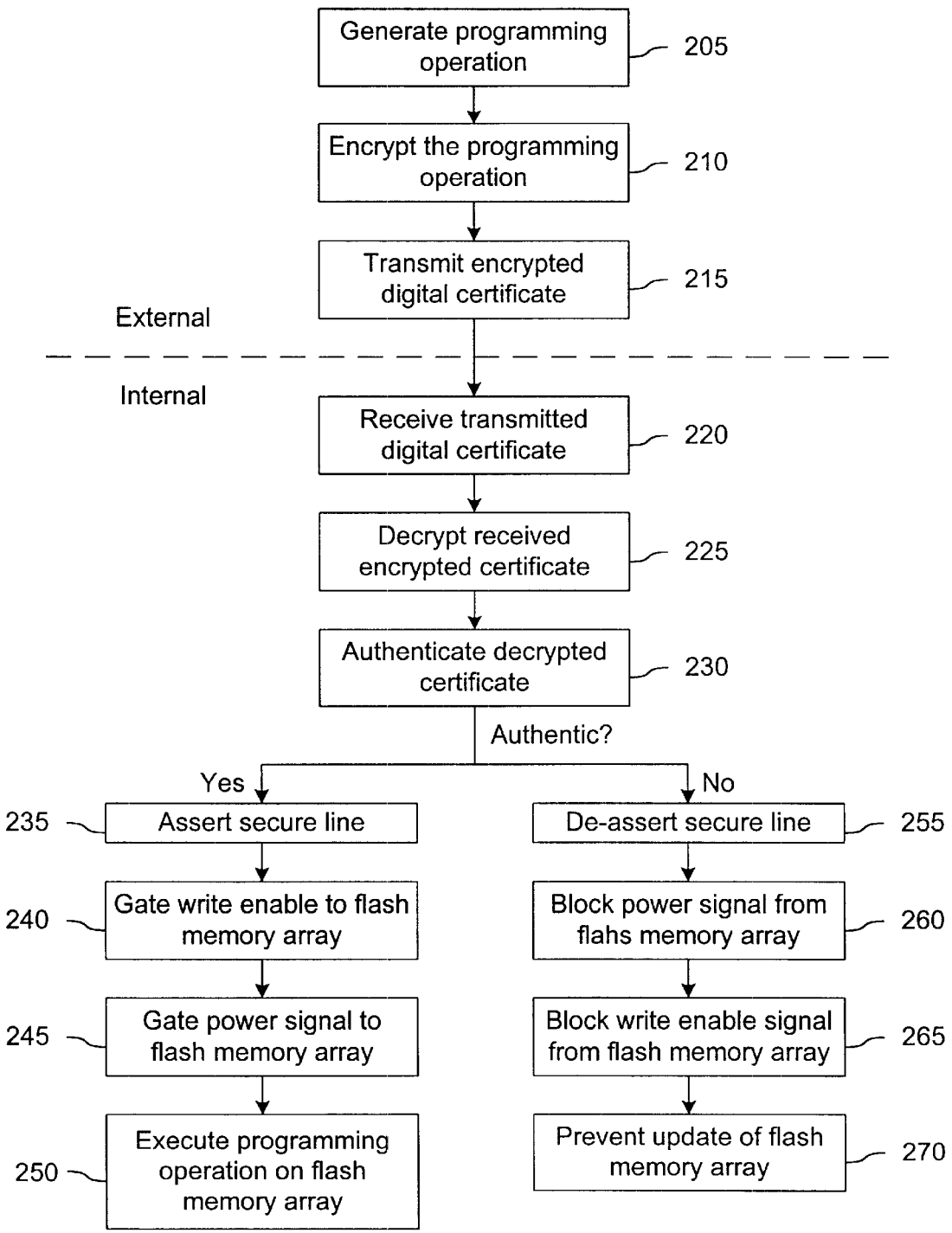
FIG. 2 is a flow chart diagram of a process for securely updating a flash memory system consistent with the present invention.

FIG. 2 is a block diagram of the operation of a secure flash memory consistent with the present invention. Under normal operations the flash memory array 10 is powered, enabled, and addressed like a standard flash ROM. This normal operation is altered, however, if the flash memory array is to be written such that the current contents are to be replaced with new contents. First, the program or system that is to reprogram the flash memory array 10 in the secure flash 100 of a controlling entity addresses the flash memory array 10 by attempting a write operation (step 205). It should be understood that although this description is with respect to a write operation, the underlying process is equally applicable to other operations, such as a read. The program addressing the flash memory array 10 then creates an encrypted certificate, which corresponds to the encrypted write operation (step 210). To create the encrypted certificate, the contents of the write operation can be signed using a public key of the controlling entity's public/private key-pair. The encrypted digital certificate is provide or transmitted to the secure flash 100 (step 215). As shown in FIG. 2, each of these steps is executed external to the secure flash 100. All of the subsequent steps, discussed below, are executed internal to the secure flash 100.

After transmitting the encrypted digital certificate, it is received by the secure flash 100 (step 220). The cryptoengine 20 uses the encryption algorithm stored in the firmware 24 to decrypt the received encrypted certificate (step 225). For example, if the certificate had been encrypted with the controlling entity's public key, it could decrypt the certificate with its private key, which can be stored in ROM 28. Once the certificate is decrypted, the cryptoengine 20 verifies or authenticates the decrypted certificate (step 230). The authentication can be performed by the cryptoengine control logic 22 by determining whether the decrypted information is coherent. For example, the format or language of the programming operation could include some bit patterns recognizable by the cryptoengine control logic 22 to determine that the decrypted information is authentic.

Figure 3:
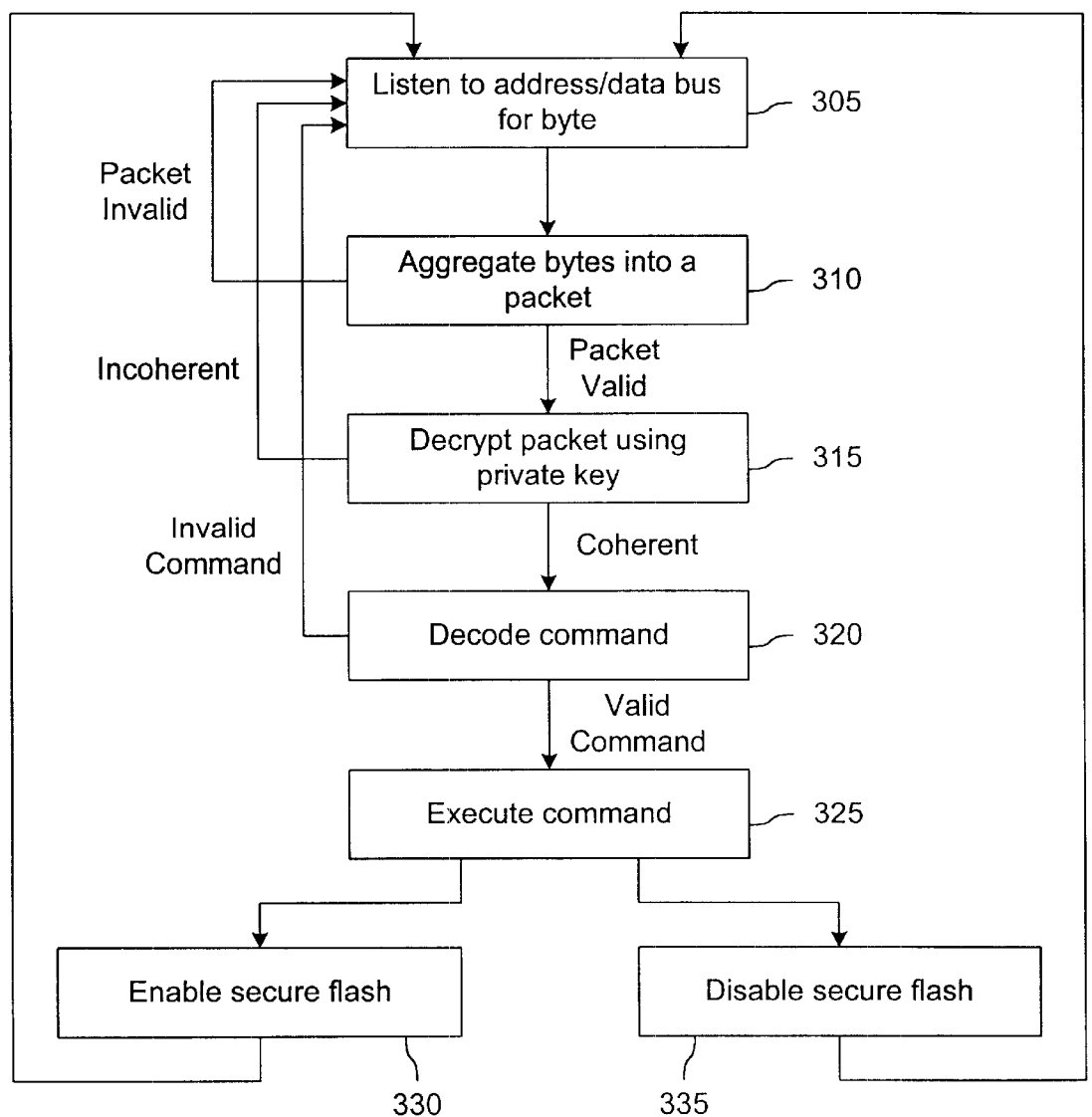
FIG. 3 is a block diagram of an authentication process in a secure flash memory consistent with the present invention.

FIG. 3 is a block diagram of an authentication process in a secure flash memory consistent with the present invention.

As data is applied to the address and data lines, these lines are monitored for any commands to access a location in flash memory array 10. For example, these lines can be monitored for bytes of data (step 305). The bytes are then aggregated into packets (step 310). This aggregation can be performed, for example, by using a simple protocol based on character delimiters and a checksum in a stream of bytes. If the packet is invalid, such as if a delimiter was not found in a certain period of characters, the authentication process returns to step 305.

If the packet is valid, cryptoengine 20 attempts to decrypt the packet in the same manner as step 225, discussed above (step 315). If the packet being decrypted was encrypted using the corresponding public key or signed using a bona fide certificate, then the packet will be coherent when decrypted. The packet is coherent if, for example, it resembles a standardized packet containing a function code and some additional parameters. If the packet is not coherent, the packet is ignored, the flash memory array 10 remains secure, and the authentication process returns to step 305.

If the packet is coherent, the packet is parsed to decode the command contained in the packet (step 320). Should the command be invalid, the process again returns to step 305. However, if the command is valid, it is executed (step 325). The executed command can, for example, enable access to the flash memory array 10 (step 330). Alternatively, the executed command can disable access to the flash memory array 10 (step 335). When the flash memory array 10 is enabled, it can be reprogrammed using standard flash-array programming protocols, as are known in the art.

Returning to FIG. 2, if the decrypted certificate corresponding to the decrypted write operation is authenticated, such as by the process described in FIG. 3, the cryptoengine control logic 22 generates a signal on the secure line 60 (step 235). The assertion of the secure line 60 enables the write enable signal on write enable line 80 to be gated to the flash memory array 10 via the second switch control 50 and a secure write enable line 85 (step 240). In addition, the first switch control 40 allows the power signal VPP to enter the flash memory array 10 in response to the assertion of the secure line 60 via a secure power signal VPP line 75 (step 245). With the secure power signal VPP and the secure write enable signal gated to the flash memory array 10, the contents of the flash memory array 10 are updated according to the decrypted write operation (step 250). In particular, the decrypted write operation is presented to the flash memory array 10 as data provided on the address and data lines.

However, if the decrypted certificate is not authenticated by the cryptoengine control logic 22, then the cryptoengine control logic 22 does not assert a signal on secure line 60 (step 255). As a result, the first switch logic 40 blocks the power signal VPP from being gated to the flash memory array 10 (step 260), and the second switch logic 50 blocks the write enable signal from being gated to the flash memory array 10 (step 265). Without the power signal VPP and the write enable signal gated to the flash memory array 10, the contents of the flash memory array 10 cannot be updated (step 270).

Although the embodiment is specifically targeted to flash memory devices, the technology could be adapted to other memory objects or other integrated circuits, such as I/O lines, electronic signals, banks of registers in an I/O chip, or a port on a particular platform. Furthermore, although the embodiment is directed to the protection from write operations, it should be understood that the technology could be adapted to prohibit any type of unauthorized operation, such as a read or execution instruction.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and a practical application to enable one skilled in the art to utilize the invention in various embodiments and with various modifications as are suited to the particular use contemplated. It is intended that the scope of the invention be defined by the claims appended hereto, and their equivalents.

I claim:

1. An integrated circuit, comprising:

a memory for receiving data information including at least an encrypted digital certificate, an enable signal that enables an operation to be performed on the memory and a power signal that powers the memory;

a cryptoengine, coupled to the memory, for receiving the encrypted digital certificate included in the data information, internally authenticating the received digital certificate, and producing a secure signal in response to a determination of authenticity; and first control logic, coupled to the cryptoengine and the memory, for selectively coupling at least one of the enable signal and the power signal to the memory in response to the secure signal, wherein the at least one of the enable signal and the power signal are not coupled to the memory if the secure signal is not produced by the cryptoengine.

2. The integrated circuit according to claim 1, wherein the first control logic includes a logic gate that receives the secure signal and the enable signal and couples the enable signal to the memory in response to the secure signal.

3. The integrated circuit according to claim 1, wherein the first control logic includes a transistor for selectively coupling the power signal to the flash memory in response to the secure signal.

4. The integrated circuit according to claim 1, the first control logic includes a logic gate that receives the secure signal and the enable signal and couples the enable signal to the memory in response to the secure signal, and includes a transistor for selectively coupling the power signal to the memory in response to the secure signal.

5. The integrated circuit according to claim 1, wherein the cryptoengine includes a ROM for storing a local digital certificate used to authenticate the encrypted digital certificate.

6. The integrated circuit according to claim 5, wherein the cryptoengine further includes second control logic for decrypting and authenticating the received digital certificate with the local digital certificate.

7. The integrated circuit according to claim 6, wherein the cryptoengine further includes third control logic for generating the secure signal when the received digital certificate is authenticated.

8. The integrated circuit according to claim 1, further comprising a non-volatile memory, coupled to the cryptoengine, for storing micro-instructions used by the cryptoengine to authenticate the received digital certificate.

9. The integrated circuit according to claim 8, further comprising a processor, coupled to the cryptoengine, for executing the micro-instructions stored in the non-volatile memory and instructing the cryptoengine to authenticate the received digital certificate based on the executed micro-instructions.

10. The integrated circuit according to claim 1, wherein the memory is a flash memory array.

11. A method for securing a memory, which includes a memory and a cryptoengine and is implemented on an integrated circuit, comprising the steps of:

receiving, at the memory, data information including at least an encrypted digital certificate, an enable signal that enables an operation to be performed on the memory and a power signal that powers the memory;

internally authenticating the received digital certificate with the cryptoengine;

producing a secure signal in response to a determination of authenticity; and selectively coupling at least one of the enable signal and the power signal to the memory in response to the secure signal, wherein the at least one of the enable signal and the power signal are not coupled to the memory if the secure signal is not produced.

12. The method according to claim 11, wherein the step of selectively coupling includes the substep of coupling the enable signal and the power signal to the memory in response to the secure signal.

13. The method according to claim 11, wherein step of authenticating includes the substep of storing a local digital certificate in a ROM accessible to the cryptoengine to authenticate the encrypted digital certificate.

14. The method according to claim 13, wherein step of authenticating further includes the substep of decrypting and authenticating the received digital certificate with the local digital certificate.

15. The method according to claim 14, wherein the producing step includes the substep of generating the secure signal when the received digital certificate is authenticated.

16. The method according to claim 11, further comprising the step of storing micro-instructions in a non-volatile memory in the memory which are used by the cryptoengine to authenticate the received digital certificate.

17. The method according to claim 16, further comprising the steps of executing the micro-instructions stored in the non-volatile memory and instructing the cryptoengine to authenticate the received digital certificate based on the executed micro-instructions.

* * * * *